US011320105B2

(12) United States Patent
Lang et al.

(10) Patent No.: US 11,320,105 B2
(45) Date of Patent: May 3, 2022

(54) LIGHTING DEVICE WITH ADJUSTABLE LIGHT DISTRIBUTION

(71) Applicant: SCHREDER S.A., Brussels (BE)

(72) Inventors: Vincent Lang, Grâce-Hollogne (BE); Roxane Caprara, Neupré (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/264,609

(22) PCT Filed: Jul. 24, 2019

(86) PCT No.: PCT/EP2019/069964
§ 371 (c)(1),
(2) Date: Jan. 29, 2021

(87) PCT Pub. No.: WO2020/025427
PCT Pub. Date: Feb. 6, 2020

(65) Prior Publication Data
US 2021/0239286 A1 Aug. 5, 2021

(30) Foreign Application Priority Data

Jul. 31, 2018 (BE) .................................. 2018/5549

(51) Int. Cl.
F21V 14/06 (2006.01)
F21S 10/00 (2006.01)
F21Y 115/10 (2016.01)

(52) U.S. Cl.
CPC ............ F21S 10/002 (2013.01); F21V 14/06 (2013.01); F21Y 2115/10 (2016.08)

(58) Field of Classification Search
CPC .............................. F21V 14/06; F21S 10/002
See application file for complete search history.

(56) References Cited

U.S. PATENT DOCUMENTS

| 8,116,011 B2* | 2/2012 | Bolis ........................ G02B 3/14 |
| | | 359/666 |
| 10,227,037 B2* | 3/2019 | Na ........................ F21S 43/145 |

(Continued)

FOREIGN PATENT DOCUMENTS

| CN | 101487579 A | 7/2009 |
| EP | 2184625 A1 | 5/2010 |

(Continued)

OTHER PUBLICATIONS

PCT International Search Report and Written Opinion, Application PCT/EP2019/069964, dated Sep. 20, 2019, 11 pages.

Primary Examiner — Arman B Fallahkhair
(74) Attorney, Agent, or Firm — McDonnell Boehnen Hulbert & Berghoff LLP

(57) ABSTRACT

Example embodiments relate to lighting devices with adjustable light distribution. One embodiment includes a lighting device. The lighting device includes a support with a first light source arranged on the support. The lighting device also includes a lens assembly that includes a flexible solid first lens element extending over the first light source. The first lens element includes a lens portion and an edge portion surrounding the lens portion. Further, the lighting device includes a retaining and adjustment means configured to change a shape of the lens portion while the edge portion is retained in a fixed position with respect to the support. The first light source and the first lens element are configured to generate a first light beam. The retaining and adjustment means is configured to adjust the shape of the first light beam.

20 Claims, 6 Drawing Sheets

(56) References Cited

U.S. PATENT DOCUMENTS

| | | | |
|---|---|---|---|
| 10,598,922 B2* | 3/2020 | Low | G01S 7/4817 |
| 11,096,256 B2* | 8/2021 | Caprara | H05B 45/30 |
| 2008/0273324 A1 | 11/2008 | Becker et al. | |
| 2008/0285143 A1 | 11/2008 | Batchko et al. | |
| 2016/0084481 A1 | 3/2016 | Duckworth | |
| 2020/0340644 A1* | 10/2020 | Lang | F21V 14/04 |

FOREIGN PATENT DOCUMENTS

| | | |
|---|---|---|
| EP | 2927574 A1 | 10/2015 |
| JP | S60220301 A | 11/1985 |

\* cited by examiner

LIGHTING DEVICE WITH ADJUSTABLE LIGHT DISTRIBUTION

CROSS-REFERENCE TO RELATED APPLICATIONS

The present application is a national stage entry of PCT/EP2019/069964 filed Jul. 24, 2019, which claims priority to BE 2018/5549 filed on Jul. 31, 2018, the contents of each of which are hereby incorporated by reference.

FIELD OF INVENTION

The invention relates to a lighting device, comprising a support with at least a first light source which is embodied as a light-emitting semiconductor element, in particular as an LED. Furthermore, the lighting device comprises at least one lens assembly with at least a first solid flexible lens element which extends over the first light source.

BACKGROUND

A lighting device of this type is known. Typically, such a lighting device has a fixed light distribution. A flexible lens element is securely arranged over the light source in a precise and deformation-free fashion with respect to the circuit board, in order actually to obtain the desired fixed light distribution of the lighting device.

Also known is a tunable lens system that is capable of adjusting the focal length of the lens with fast response without causing spherical aberration. The lens system includes a lens made from a transparent solid material; and a layer including electrodes to transform the shape of the lens. This layer sticks to the lens and is configured such that its area contracts or expands based on the electric energy applied and transforms the shape of the lens correspondingly to the contracted or expanded area so as to adjust the focal length of the lens without spherical aberration.

SUMMARY

The object of embodiments of the present invention is to develop a lighting device of the type mentioned in the preamble to obtain a lighting device with a light distribution which can be adjusted reliably in a robust and simple way.

According to a first aspect of the invention there is provided a lighting device comprising a support with at least a first light source, a lens assembly and a retaining and adjustment means. The first light source is arranged on the support. The lens assembly comprises at least a flexible solid first lens element which extends over the first light source. The first lens element comprises a lens portion and an edge portion surrounding the lens portion. The lens portion has a first at least partially concave surface facing the first light source and/or a second at least partially convex surface located on an opposite side thereof. The retaining and adjustment means is configured to change the shape of the lens portion whilst the edge portion is retained in a fixed position with respect to the support. The first light source and the first lens element are configured to generate a first light beam. The retaining and adjustment means is configured for adjusting the shape of the first light beam.

The first light beam may be delimited by a conical envelope, typically a non-circular conical envelope with a non-circular directrix D, e.g. an oblique non-circular conical envelope. This is illustrated in FIG. 12. The retaining and adjustment means may then be configured for adjusting the directrix D, i.e. the shape of a right section R of the non-circular conical envelope (i.e. a section through the conical envelope, perpendicular on the axis A of the conical envelope, the axis A being a straight line joining the vertex V with the centroid c of the base B). More in particular the non-circular conical envelope may comprise one or more outer generators G1, G2 at a local maximum angle g1, g2 with the axis A of the non-circular conical envelope. The retaining and adjustment means may then be configured for adjusting these one or more local maximum angles g1, g2. For example, for street lights the first light beam may be symmetrical with respect to the C90/C270 plane which is oriented perpendicular on the street direction. Preferably, the angle b1, b2 between the plane of the base B and the one or more generators G1, G2 corresponding with the one or more local maximum angles g1, g2 (typically two local maxima will be present on either side of the C90/C270 plane, in case of a symmetrical light beam) can be changed. In that manner, the light beam can be adjusted to the street/path to be illuminated, and in particular the light beam can be adjusted to the width of the street. For example, the light beam can be more narrow (seen in a lateral direction of a lane) and longer (seen in a longitudinal direction of a lane) for illuminating a narrow lane, and the light beam can be wider (seen in a lateral direction of a lane) and shorter (seen in a longitudinal direction of a lane) for illuminating a wider lane. The vertex V corresponds with the location of the first light source. The skilled person understands that in reality this may not be a single point, as the light source may be formed out of a plurality of light emitting elements, and that the representation of FIG. 11 is an approximation of the reality.

The retaining and adjustment means can change the shape of the first lens element in order to change the shape of the first light beam, and in particular the shape of a non-circular conical envelope of the first light beam. With a changed shape, the lens has a changed light transmission and/or refraction behavior causing the shape of the first light beam to be modified. This results in a changed light distribution of the lighting device. In other words, using the retaining and adjustment means the light distribution can be varied. For example, the light distribution of the lighting device can be adapted to the installation location of the lighting device. Therefore, the installation work of such lighting devices is simplified since they can be embodied with a lower degree of precision. The adaptation of the desired light distribution can in particular occur after installation of the lighting device.

Also, because the first lens element comprises a lens portion and an edge portion surrounding the lens portion, and because the lens portion has a first at least partially concave surface facing the first light source and/or a second at least partially convex surface located on an opposite side thereof, the lens portion can be elastically deformed in a reliable and simple manner by the retaining and adjustment means. Indeed, the retaining and adjustment means can change the shape of the lens portion by elastic deformation whilst the edge portion is retained in a fixed position with respect to the support.

Through the edge portion, the lens assembly can be secured relative to the light source, but a change in the shape of the lens portion remains possible under the effect of the retaining and adjustment means.

The lens surface facing away from the first light source is at least partially convex, and/or the lens surface facing the first light source is at least partially concave. Such a first lens element can be arranged arching over the light source on the support. Such a first lens element makes it possible to change the light distribution of the lighting device particularly easily when the shape of the lens portion changes.

In particular when used in street lamps, lighting devices with a variable light distribution are advantageous. For example, the light distribution of a street lamp which is not oriented in an optimum way or for which the orientation has changed, for example, as a result of the effect of unplanned-for forces such as unusually high wind loads or as a result of settling phenomena in the vicinity of the base of the street lamp, can be adapted easily and in preferred embodiments from a distance. Furthermore, with such a lighting device it is possible to adapt the light distribution according to a change occurring within the lighting device environment. For example, it is possible to adapt the light distribution during rainy weather with a wet and highly reflective roadway surface in such a way that the traffic is not dazzled. Also, when a road has changed (e.g. additional lane, change in circulation direction, etc.), the light distribution may be adapted. Furthermore, such a lighting device makes it possible to adapt the light distribution in order to temporarily deflect part of the luminous flux onto normally unlit sections, e.g. in case of failure of a neighboring luminaire. It is therefore possible, for example, for a footpath or cycle path to be illuminated by changing the light distribution during the passage of a cyclist or pedestrian. Also, it is possible to have a dynamic lighting of a road in function of events happening in the road, e.g. following of passing cars, etc. A variable light distribution in a lighting device can therefore be used, for example in the case of deployment in a street lamp, to achieve safer and at the same time more energy-saving illumination of the respective traffic situation. By virtue of the fact that the shape of the lens portion can be changed using the retaining and adjustment means, the light distribution of the lighting device can easily be changed in order to implement the abovementioned advantages.

Also, the lighting device of the invention has the advantage that the storage space needed for storing lighting devices can be reduced since the same type of lighting device can be used for obtaining differently shaped light beams.

Preferably, the retaining and adjustment means is configured for changing a direction of one or more outer generators of a non-circular conical first light beam over at least 1°, preferably at least 2°, more preferably over at least 3°, for example over at least 5°. In that manner the first light beam can be adjusted sufficiently to modify a lighting pattern on a surface, e.g. a road to be illuminated.

Preferably, the first light source is embodied as at least one light-emitting semiconductor element, such as a LED.

In a preferred embodiment the first surface is a fully concave surface and/or the second surface is a fully convex surface. In a particularly preferred embodiment the first surface is a fully concave surface and the second surface is a fully convex surface.

According to an exemplary embodiment, the lens portion comprises a central portion and a circumferential portion surrounding the central portion, said circumferential portion being connected to the edge portion; wherein the retaining and adjustment means is configured to be in contact with the circumferential portion and not with the central portion. Preferably the outer surface area of the circumferential portion is less than 20% of the outer surface area of the lens portion, and the outer surface area of the central portion is more than 80% of the outer surface area of the lens portion.

In that manner the retaining and adjustment means can operate on the circumferential portion through which no light or only a small amount of light passes, whilst changing the shape of the central portion in order to change the light distribution.

According to a possible embodiment, the retaining and adjustment means is configured to perform a pushing or pulling action on the circumferential portion, whilst retaining the edge portion.

According to an exemplary embodiment, the retaining and adjustment means comprises at least one movable and/or deformable part and an actuating means configured to move or deform the moveable part, and an optional control means for controlling the actuating means. It is noted that the actuating means may be controlled manually in which case the control means may be omitted. In that manner the moveable and/or deformable part may operate on the lens portion and cause a change of the shape thereof in a simple, controlled and reliable manner. In further developed embodiments, a feed-back loop may be used to control the actuating means. For example, a light sensor may be used to measure the light pattern, and the control means may be configured to control the actuating means in function of data measured by the light sensor. For example, the actuating means may move a moveable part upward and downward with respect to the support. For example, the movable part could be a screw and the actuating means could be e.g. a linear stepper motor. According to another example, the movable and/or deformable part and the actuating means may be formed by a piezo electric element or electromagnetic element. According to yet another example the movable and/or deformable part may be a bimetallic strip and the actuating means may comprise a temperature regulator comprising a heat source and/or a cooling source. In some embodiments the moveable part may be moved in various directions.

According to a possible embodiment the at least one movable and/or deformable part is arranged between the support and the circumferential portion.

According to another possible embodiment, the at least one movable and/or deformable part is arranged in the circumferential portion or in contact with the circumferential portion.

According to a possible embodiment the movable and/or deformable part has an end in contact with the lens portion, such that a movement or deformation of the part can directly influence the shape and/or thickness and/or curvature of the lens. In particular, the movable and/or deformable part can be secured to the lens portion in such a way that the lens portion can also be deformed under tension or compression. The compression or tension may be e.g. in a plane parallel or perpendicular to the support or in a plane making an angle between 0° and 90° relative to the support.

According to an exemplary embodiment the retaining and adjustment means is configured to change the thickness of at least one section of the lens portion and/or the curvature of at least one section of a surface of the lens portion. By changing the thickness and/or the surface curvature, even only changing these variables partially, the light-refracting properties of the lens, in particular the local light refraction can be selectively adapted so that the desired light distribution of the lighting device is obtained.

According to an exemplary embodiment the retaining and adjustment means comprises at least one retainer element, against which at least one section of the edge portion is supported counter to a change in shape of the lens portion. This retainer element may comprise a frame arranged over the edge portion and fixed to the support, using e.g. a plurality of screws, rivets, bolts or the like. In other embodiments the at least one retainer element may consist of a plurality of screws, rivets, bolts or the like which attach the edge portion directly to the support.

The edge portion may be secured with respect to the support by means of the frame in order to prevent changes in position of the edge portion. This may be assisted, for example, by openings in the support and the edge portion into which a holding pin is inserted. Alternatively or additionally, the edge portion may be adhered to the support. Also, the frame may be larger than the edge portion and surround the edge portion, and may then be directly fixed to the support or to a part of the housing of the lighting device.

According to an exemplary embodiment the retaining and adjustment means is configured to change a distance between at least a part of the lens portion and the support. A change in shape of the lens portion can easily be brought about by changing the distance between a part of the lens portion and the support.

According to an exemplary embodiment the retaining and adjustment means comprises at least one frame element arranged adjacent the lens portion and configured for securing the edge portion against the support, and actuating means configured for displacing and/or deforming said at least one frame element in order to change the shape of the lens portion. The displacing may be a translation and/or a rotation of the frame, preferably in a plane parallel to the support, such that the frame is brought in contact with the lens portion causing a change in shape of the lens portion.

In this case, the complexity of the lighting device can be reduced by using the at least one frame element both as a retaining means and as an adjustment means. The at least one frame element can be shiftable and/or rotatable, for example, in an XY plane parallel to the surface of the support. When the frame element is shifted, rotated or distorted it acts as an adjustment means on the lens portion in such a way that a change in the shape of the lens portion occurs. In order to promote the effect, the at least one frame element can have a particularly configured shape such as, for example, a recess for the flexible lens portion through which the shape of the latter can be influenced in a targeted fashion.

According to an exemplary embodiment the support is a circuit board, more in particular a printed circuit board.

According to an exemplary embodiment the retaining and adjustment means comprises a translucent or transparent plate arranged in contact with the at least partially convex surface of the lens portion, and actuating means for moving said transparent plate relative to the support in order to change the shape of the lens portion. By using a transparent plate the light transmission is not significantly influenced, so that the transparent plate may be arranged above a central portion of the lens element. A movement of the transparent plate towards the lens element will then cause a flattening of the lens element, resulting in a changed light distribution. Such embodiments may be particularly useful when the lens portion is non-rotational symmetric around an axis perpendicular on the transparent plate, but the invention is not limited to such embodiments.

The transparent or translucent plate may be a protective cover, such as a protective glass or a transparent or translucent plastic plate, which forms an adjustment means and is movable relative to the support. The protective cover may serve to protect the lens portion of the lens assembly, for example against damage or soiling. Furthermore, the protective cover is in contact with the lens or can be placed in contact with the lens, upon which a further movement of the protective cover relative to the support within a plane which is parallel to the surface of the support and/or a direction perpendicular to this plane can bring about a change in shape of the lens and therefore a change in the light distribution of the lighting device.

According to an exemplary embodiment the retaining and adjustment means comprises an actuator which is movable and/or deformable under the influence of electrical, magnetic and/or thermal effects. The actuator may be located outside of the lens portion, e.g. on a surface of the lens portion or in contact with a surface of the lens portion, or may be received in the lens portion.

When an actuator is introduced in the lens portion, which can be actuated electrically, magnetically and/or thermally, the deformation of the lens portion can take place in a particularly targeted fashion. The change in the light distribution of the lighting device can occur in a particularly reliable and accurate fashion as a result of this.

Also, when the actuator is arranged on or in contact with a lens surface, the change in shape of the lens portion and therefore the light distribution of the lighting device can be changed in a particularly targeted and reliable fashion. The attachment of an actuator to the surface is also easily possible after the production of the lens. Therefore, the lighting device according to the invention can be manufactured in a simple and cost effective fashion.

According to an exemplary embodiment a second light source is arranged on the support, and the lens assembly comprises a flexible solid second lens element which extends over the second light source, said second lens element comprising a second lens portion and a second edge portion connected to the edge portion of the first lens element, wherein the retaining and adjustment means is further configured to change the shape of the second lens portion whilst the second edge portion is retained in a fixed position with respect to the support. The second light source and second lens element are configured to generate a second light beam, and the retaining and adjustment means are configured for adjusting the shape of the second light beam. This may be done in the same manner as described above for the first light beam. For outdoor applications such as road lighting, typically even more light sources and corresponding lens elements are provided, and the skilled person understands that some or all of the lens portions of the plural lens elements may be associated with the retaining and adjustment means. The retaining and adjustment means may be configured to adjust each adjustable lens portions independently or to adjust groups of adjustable lens portions in dependence of each other.

In preferred embodiments more than two light sources and corresponding lens elements are provided; e.g. a least four light sources with at least four corresponding lens elements, e.g. arranged in a matrix of 2×2. Further, the first light source may comprise a plurality of light emitting elements, such as light emitting semiconductor elements, in particular LEDs, such that a plurality of light emitting elements are present below each lens portion.

According to an exemplary embodiment the two or more lens elements are manufactured in one integral piece.

In one particularly preferred embodiment, the lighting device has a plurality of light sources and a corresponding plurality of flexible lens elements. As a result, the luminous flux of the lighting device can be increased. The shape of individual lens portions of the plurality of lens elements can preferably be changed independently of one another with the result that the light distribution of the lighting device can be varied in a particularly wide range. In other embodiments, the shape of individual lens portions of the plurality of lens elements may be changed in dependence, e.g. simultaneously, e.g. by a common retaining and adjustment means. In a preferred embodiment, the edge portions of the plurality of lens elements may be connected and may be secured between the support and a frame element, with the result that a change in the shape of the lens portion of the first lens element is prevented from propagating to a lens portion of a further lens element. This permits a reliable change in the shape of the plurality of lens portions and therefore a reliable adaptation of the light distribution of the lighting device.

According to an exemplary embodiment the edge portion has a flat lower surface arranged against the support. In that manner the flat portion can be easily secured against the support.

According to a preferred embodiment the first lens element is one integral element, i.e. the lens portion and the edge portion are part of one integral piece which may be e.g. formed as an injection molded piece.

The retaining and adjustment means preferably comprises a retainer, against which one section of the lens element, typically the edge portion, is supported counter to a change in position brought about as a result of the adjustment. At least one section of the lens element is secured by the retainer in the event of a change in shape. This ensures that the effect of the adjustment on the lens portion results in a change in shape of the lens portion, and not merely in shifting of the entire lens element while retaining the shape. This permits a change in the light distribution of the lighting device to be brought about in a targeted fashion. The reliability of the lighting device is therefore improved.

In a preferred embodiment the retaining and adjustment means is arranged substantially outside of the path of the first light beam of the first light source passing through the first lens element. Therefore, when the light distribution of the lighting device is selected it is not necessary to pay attention to the arrangement of the retaining and adjustment means. Substantially outside means that more than 80% of the first light beam is not hindered by the presence of the retaining and adjustment means.

In an exemplary embodiment the retaining and adjustment means comprises at least two adjustment means operating on different portion of the lens portion, preferably two different portions of the circumferential portion of the lens portion. As a result, the change in the shape of the lens can be selected more flexibly and more freely.

The lens element is advantageously a so-called free form lens. A freeform lens is non-rotation symmetrical, but can have, but does not have to have, spherical sections on its surface. Using a freeform lens, the light distribution of the lighting device can be selected in an entirely targeted fashion. Likewise it is possible to define a specific reaction or deformation of the lens under the effect of the adjustment means and to define the resulting refraction of light in the lens and the light distribution of the lighting device.

In the context of the invention, a lens element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface facing a light source, or more generally a lens portion with a flat or curved surface facing the light source, and optionally a collimator portion integrally formed with said lens portion, said collimator portion being configured for collimating light transmitted through said lens portion. Also, a lens element may be provided with a reflective portion or surface or with a diffusive portion.

In an exemplary embodiment, the first lens element is arranged to be movable relative to the support, preferably such that a position of the first lens element geometrically projected on a surface of the support can be changed. For example, the lens assembly with the associated retaining and adjustment means may be movable relative to the support, using e.g. rails or any other suitable guiding system.

The light emitted by the first light source will be distributed in a certain manner by the first lens element. By arranging the first lens element movably relative to the support, the positioning of the first light source relative to the first lens element can be varied, and thus the light distribution on the surface to be illuminated can be changed as well. In such a way, the light emitted and its distribution may be correlated to different positions of the first lens element with respect to the support and can be adapted more easily to different sites and/or applications without having to mount different optical components. The moving may be done automatically or manually, at the factory, during installation as well as during occasional or everyday usage of the light device. It is noted that such moving may have a larger impact on the light distribution than the adjusting of the shape of the first lens element. Thus, optionally, the moving of the first lens element relative to the support may be done as a first adjustment and the adjusting of the shape may be used for fine-tuning the light distribution.

In an exemplary embodiment, the lighting device further comprises a moving means configured to move the first lens element relative to the support. The moving means may be controlled manually or via a control means, optionally the same control means which control the actuating means of the retaining and adjustment means.

Preferably, the edge portion of the first lens element is mounted substantially parallel to the support; and the edge portion is arranged to be movable relative to the support in a plane substantially parallel to the support.

Optionally, the first lens element may be arranged movably relative to the first light source in a plane parallel to the support. Optionally, the first lens element may be part of a lens plate, and then the lens plate may be movable relative to the support with the at least one light source. More in particular, embodiments of the invention may be combined with any one of the movement systems described in the following patent specifications in the name of the applicant, which are included herein by reference: PCT publication WO 2019/134875 A1, patent applications in The Netherlands with application numbers N2022293, N2022294, N2022295, N2022296, N2022297, N2022298, N2022300. It is noted that during the changing of the shape of the lens portion, the edge portion is kept in a fixed position relative to the support, but this may be combined with a movement as described above, wherein e.g. before (or after) the changing of the shape of the lens portion, the first lens element is moved relative to the support as explained above.

According to an exemplary embodiment, a lens element has an internal surface facing the light source and an external surface. In a common embodiment the internal surface and the external surface each comprise a single continuously curved surface. However, in other embodiments, the internal surface and/or the external surface may comprise a first curved surface and a second curved surface, said first curved surface being connected to said second curved surface through a connecting surface or line comprising a saddle point or discontinuity. The retaining and adjustment means may then be adapted to change the shape of the first curved surface and/or of the second curved surface.

The support may be movably arranged relative to the lens element to position the light source either in at least a first position facing the first curved surface or in at least a second position facing the second curved surface. When the external surface is implemented as described, preferably the external surface comprises a first outwardly bulging surface, a second outwardly bulging surface, and an external connecting surface or line connecting said first and second outwardly bulging surfaces. However, it is also possible to have a continuous outer surface and to implement only the internal surface as described. When the internal surface is implemented as described, preferably the internal surface comprises a first outwardly bulging surface, a second outwardly bulging surface, and an internal connecting surface or line connecting said first and second outwardly bulging surfaces. The term "outwardly bulging surface" is used here to refer to a surface which bulges outwardly, away from an associated light source. An outwardly bulging external surface forms a protruding portion, whilst an outwardly bulging internal surface forms a cavity facing an associated light source.

By providing such curved surfaces, the optical element is given a "double bulged" shape allowing to generate distinct lighting patterns depending on the position of the light source with respect to the optical element and/or depending on the shape of the first and/or second curved surface which may be changed by the retaining and adjustment means. More in particular, the shape, the size and the location of the light beam may be different depending on the position of the light source with respect to the optical element and/or depending on the shape of the first and/or second curved surface which may be changed by the retaining and adjustment means. This may further improve the possibilities for illuminating various types of environments, such as roads or paths, with the same luminaire system. Also, this may further improve the possibilities for adjusting a lighting pattern in function of the height at which the luminaire system is located above the surface to be illuminated.

In an exemplary embodiment the lens element is fabricated from optical silicone. Optical silicone is transparent to visible light and flexible so that for this reason flexible lens elements can be produced particularly easily from this material.

The first flexible lens element may be a secondary lens element. This means that a further primary lens element may be arranged in the beam path of the light emitted by the light source. Said primary lens element is, for example in the case of light-emitting semiconductor elements in the form of LEDs, a first rigid lens which is mounted directly on the LED. Said rigid lens element ensures that the light emitted by the semiconductor element is distributed. The primary lens element can, however, also be formed by a further flexible lens, in which case an adjustment means can also be assigned to this further flexible lens element. The adjustment of the primary lens element may be independent of the adjustment of the secondary lens element. Providing two flexible lens elements, whose shape can be changed using adjustment means, in the beam path of the light emitted by the first light source permits the light distribution of the lighting device to be changed in a particularly flexible and variable fashion. Therefore, light distributions which are not readily possible with merely one flexible lens element, can be achieved using a plurality of lens elements whose shape can be changed.

In exemplary embodiments, the deformation of the lens portion by the retaining and adjustment means takes place continuously or at least quasi-continuously in sufficiently small steps. For example, quasi-continuous changes in the length and/or position of the actuators can be carried out by means of piezo-electric actuators with a quasi-continuously changing voltage. This gives rise to an at least quasi-continuous change in shape of the lens portion and in the light distribution which results from the shape of the lens portion.

According to a further aspect there is provided a luminaire, in particular an outdoor luminaire, comprising a base and a luminaire head attached to the base, said luminaire head comprising a lighting device according to any one of the previous embodiments. By outdoor luminaire, it is meant luminaires which are installed on roads, tunnels, industrial plants, campuses, parks, cycle paths, pedestrian paths, or in pedestrian zones for example, and which can be used notably for the lighting of an outdoor area, such as roads and residential areas in the public domain, private parking areas and access roads to private building infrastructures, etc.

According to a further aspect there is provided lighting control system comprising a lighting device according to any one of the previous embodiments and a control means (part of the lighting device and/or remote from the lighting device) for controlling the retaining and adjustment means and/or for controlling the moving means and/or for controlling the driving of at least the first light source. The control means may comprise a single controller or multiple controllers arranged at the same or at different locations. The control means may be configured to receive data, e.g. sensor data, and to control the retaining and adjustment means and/or the moving means and/or the driving of at least the first light source in function of the received data.

The lighting control system may be for controlling a plurality of lighting devices. The control means may be integrated in the lighting device or may be a remote device, e.g. a remote device associated with a plurality of lighting devices to be able to have an overview of the situation of the plurality of lighting devices. Any environmental data or light related data may be measured using one or more sensor devices which may be integrated in some or all of the lighting devices or may be external of the lighting devices. The data measured by the one or more sensor devices or data derived therefrom may be sent via a communication interface to the control means. Based on the measurement data and/or other data, the control means may be configured to determine light beam shape adjustment data indicating whether the shape of the light beam needs to be adjusted. Based on the light beam adjustment data the control means may then control the retaining and adjustment means and/or the moving means and/or the driving of at least the first light source of the one or more lighting devices accordingly.

As mentioned above, in alternative embodiments the controlling of the retaining and adjustment means and/or the moving means may be done manually, in particular at the commissioning or at the factory. Exemplary embodiments may include an indication means to indicate different positions and/or configurations of the retaining and adjustment means and/or of the moving means corresponding to different light distributions.

In an embodiment, the control means is remote from at least one lighting device of the plurality of lighting devices. The control means may be comprised in a lighting device of the plurality of lighting devices or in a cabinet near the plurality of lighting devices or in any remote server. The lighting device may be part of a network of lighting devices but may also be an isolated lighting device.

According to a preferred embodiment, a notification module is included in the lighting device and configured for notifying measured data (see above) to an operator or to the control means. This may also be audio or visual notifications. When sent to the control means, the control means can be configured to take appropriate action in response to the notifications, and in particular to control the retaining and adjustment means and/or the moving means and/or the driving of at least the first light source.

The control means may further control a driver for driving the one or more light sources of the lighting device in accordance with the measurement data. Optionally, the driver may also be used to drive the actuator of the retaining and adjustment means.

In an exemplary embodiment an additional first light source is arranged on the support, opposite the first lens element, and the first light source and the additional first light source are connected such that they can be operated independently of each other. When a lighting control system comprises such a lighting device, there may be provided a control means for controlling the retaining and adjustment means in function of an operation state of the first light source and the additional first light source.

In that manner, the shape of the lens may be adjusted in function of e.g. which light source is on, which light source is dimmed, the colour and/or temperature of the light source, etc.

The first light source and the additional first light source may be part of a plurality of groups of LEDs, wherein at least a first LED (the first light source) of a first group and a second LED (the additional first light source) of a second group may be arranged opposite the first lens element. Optionally, the control means and the driver may be configured to drive selectively the plurality of groups of LEDs wherein LEDs of the same group are driven simultaneously but wherein different groups can be driven independently of one another. Exemplary embodiments implementing selective driving can be found in PCT publication WO 2019/020366 A1 in the name of the applicant, which is included herein by reference. The retaining and adjustment means may then be controlled in function of the operation state of the first and second LED.

According to a preferred embodiment, the lighting control system further comprises a mobile device with a display, and the notification module may be configured to display information to the field operator based on the measured data. Further the mobile device may be configured to control the retaining and adjustment means of the one or more lighting devices. According to an exemplary embodiment, the notification module is configured to display an overview representing the data of the plurality of lighting devices. In this manner, the field operator can visualize more efficiently for which lighting devices corrections are needed, and he may then use his mobile device to control the retaining and adjustment means appropriately.

According to a preferred embodiment, the one or more sensors comprise one or more of the following sensors: a light sensor, a microphone, a detector of $CO_2$, $NO_x$, smoke, an accelerometer, a GPS receiver, a visibility sensor, a motion sensor, a passive infrared sensor, an image sensor, a camera.

The control means is typically implemented using a computer program. According to a further aspect of the invention, there is provided a computer program comprising computer-executable instructions to perform any one of the control steps performed by the control means described above, when the program is run on a computer, according to any one of the steps of any one of the embodiments disclosed above. According to a further aspect of the invention, there is provided a computer device or other hardware device programmed to perform one or more steps of the control means disclosed above. According to another aspect there is provided a data storage device encoding a program in machine-readable and machine-executable form to perform one or more steps of the control means disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Identically acting elements of the invention are provided below with uniform reference numbers where appropriate. The features of the exemplary embodiments described below can also be subject matter of the invention in other combinations of features, but at least in combination with the features in any one of the claims.

Figure 1A:
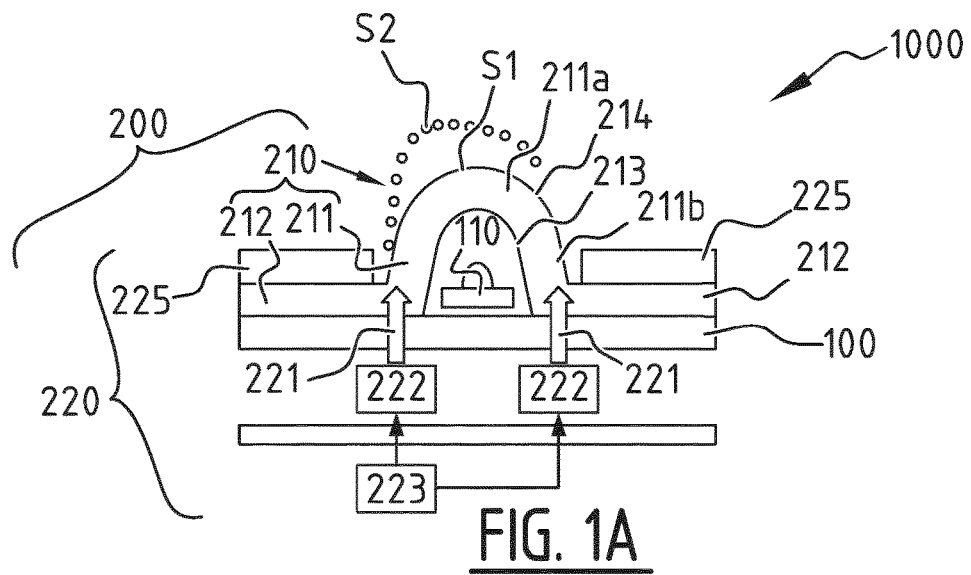
FIG. 1A is a cross section of an exemplary embodiment of a lighting device.

FIG. 1A shows a lighting device 1000 according to the invention. The lighting device 1000 comprises a support 100 with at least a first light source 110, and a lens assembly 200. The first light source 110 is arranged on the support 100 and is preferably embodied as at least one light-emitting semiconductor element, more preferably at least one LED. The lens assembly 200 comprises at least a flexible solid first lens element 210 which extends over the first light source 110, and a retaining and adjustment means 220. The first lens element 210 comprises a lens portion 211 and an edge portion 212 surrounding said lens portion 211. The lens portion 211 has a first concave surface 213 facing the first light source 110 and a second convex surface 214 located on an opposite side thereof. The retaining and adjustment means 220 is configured to change the shape of the lens portion 211 whilst the edge portion 212 is retained in a fixed position with respect to the support 100.

The lens portion 211 comprises a central portion 211a and a circumferential portion 211b surrounding the central portion 211a. Preferably the outer surface area of the circumferential portion 211b is less than 20% of the outer surface area of the lens portion 211. The circumferential portion 211b is connected to the edge portion 212. The retaining and adjustment means 220 is configured to be in contact with the circumferential portion 211b and not with the central portion 211a.

In the illustrated embodiment, the retaining and adjustment means 220 comprises at least one movable and/or deformable part 221, an actuating means 222 configured to move or deform the moveable and/or deformable part, and an optional control means 223 for controlling the actuating means 222. The at least one movable and/or deformable part 221 may be arranged at least partly between the support 100 and the circumferential portion 211b. The moveable part 221 and the actuating means 222 may be implemented as one integral part. In the illustrated embodiment the moveable or deformable part 221 can push against a lower surface of the circumferential portion 211b of the lens portion 211 to change the shape of the lens portion 211. In the present exemplary embodiment, the moveable parts 221 may be embodied e.g. as screws, extending through the support 100, typically a printed circuit board. Other possible embodiments of the moveable part 221/actuating means 222/control means 223 are: a piezo electric element or electromagnetic element 221, 222 controlled by electrical pulses generated by a control means 223, a bimetallic strip 221 with associated heating means 222 which are controlled by the control means 223.

In non-illustrated embodiments the moveable or deformable part 221 could be attached to the lower surface of the circumferential portion 211b of the lens portion 211 and the actuating means 222 could be configured to perform a pulling or pushing action on the circumferential portion 211b.

The retaining and adjustment means 220 further comprises a retainer element 225, here in the form of a frame element, against which at least one section of the edge portion 212 is supported counter to a change in shape of the lens portion 211. The frame element 225 may be a plate provided with a recess for the lens portion 211 whilst covering the edge portion 212 of the lens element 210. The frame element 225 may be fixed to the support 100 or to the housing (not illustrated) using e.g. screws or rivets or clamps.

The retaining and adjustment means 220, by having components 221, 222, 223, 225, is configured to change the curvature of at least a section of a surface of the lens portion 211 by changing a distance between the lens portion 211 and the support 100, see shapes S1 and S2 in FIG. 1A.

Figure 1B:
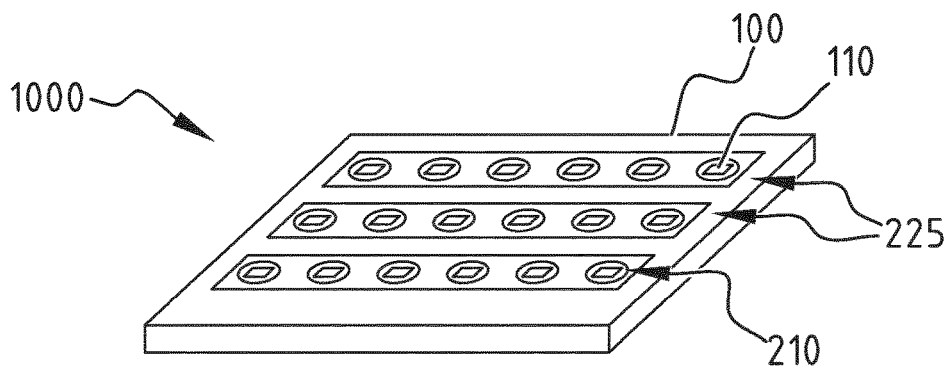
FIG. 1B is a perspective view of an exemplary embodiment comprising a plurality of light sources.

FIG. 1B illustrates a perspective view of a lighting device 1000 which is similar to the embodiment of FIG. 1A with this difference that a plurality of light sources 110 and corresponding lens elements 210 are provided, here a matrix of 3×6 light sources 110 and lens elements 210. One or more of the lens elements 210 may be provided with retaining and adjustment means 220 as described above in connection with FIG. 1A.

Optionally, one or more additional first light sources (not shown) may be arranged on the support 100, opposite the first lens element 210, and the first light source 110 and the one or more additional first light sources may be connected such that they can be operated independently of each other. When a lighting control system comprises such a lighting device, there may be provided a control means for controlling the retaining and adjustment means 220 in function of an operation state of the first light source 110 and the one or more additional first light sources. Optionally, such control means may be an integrated with control means 223. In that manner, the shape of the lens portion 211 may be adjusted in function of e.g. which first or additional first light source is on, which first or additional first light source is dimmed, the colour and/or temperature of the first and additional first light sources, etc.

Optionally, the first lens element 210 is arranged to be movable relative to the support 100 (not illustrated), preferably such that a position of the first lens element geometrically projected on a surface of the support 100 can be changed. For example, the lens assembly 200 with the associated retaining and adjustment means 220 may be movable relative to the support 100, using e.g. rails or any other suitable guiding system. The moving may be done automatically or manually, at the factory, during installation as well as during occasional or everyday usage of the light device. It is noted that such moving may have a larger impact on the light distribution than the adjusting of the shape of the lens portion 211 of the first lens element 210. Thus, optionally, the moving of the first lens element 210 relative to the support 100 may be done as a first adjustment and the adjusting of the shape may be used for fine-tuning the light distribution. In an exemplary embodiment, the lighting device further comprises a moving means (not illustrated) configured to move the first lens element 210 relative to the support 100. The moving means may be controlled manually or via a control means, optionally the same control means 223 which control the actuating means 222 of the retaining and adjustment means 220. Preferably, the edge portion 212 of the first lens element 210 is mounted substantially parallel to the support 100, and the edge portion 212 is arranged to be movable relative to the support 100 in a plane substantially parallel to the support 100.

The optional features described in the paragraphs above may also be included in any one of the embodiments described below.

Figures 2A, 2B:
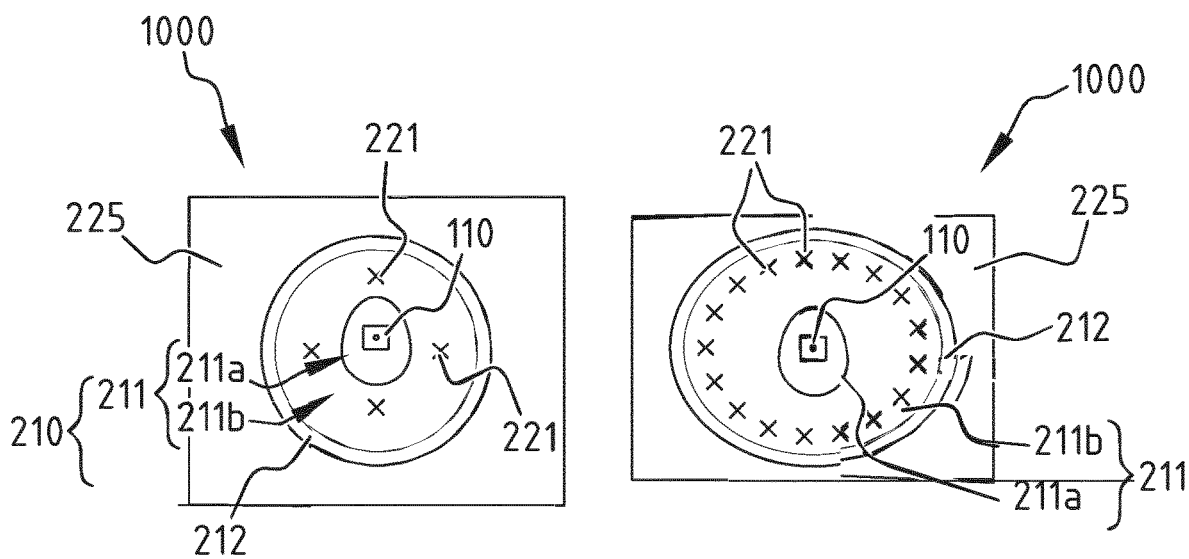
FIGS. 2A and 2B are top views of an exemplary embodiment of a lighting device.

FIG. 2A illustrates a lighting device 1000 which may be the same as the one illustrated in FIG. 1A. FIG. 2A illustrates a top view showing that four movable and/or deformable parts 221 are provided, equally spread around the central portion 211a of the lens portion 211. FIG. 2B illustrates another embodiment in which a large amount of movable and/or deformable parts 221 are arranged in the circumferential portion 211b. There may be provided a single actuating means for a group of movable and/or deformable parts 221 or each moveable and/or deformable part 221 may have its own actuating means, such that each movable and/or deformable part 221 can be actuated independently of the other movable and/or deformable parts. The distribution of the movable and/or deformable parts 221 can be symmetrical or asymmetrical. The use of a plurality of movable and/or deformable parts 221 permits greater influence to be exerted on the deformation of the lens portion 211. A large number of movable and/or deformable parts 221, as in FIG. 2B, permits a virtually continuous deformation of the lens portion 211. This deformation of the lens portion 211 may be controlled such that it has an analogous effect on the light distribution compared to the movement of the light source 110 itself.

Figure 3:
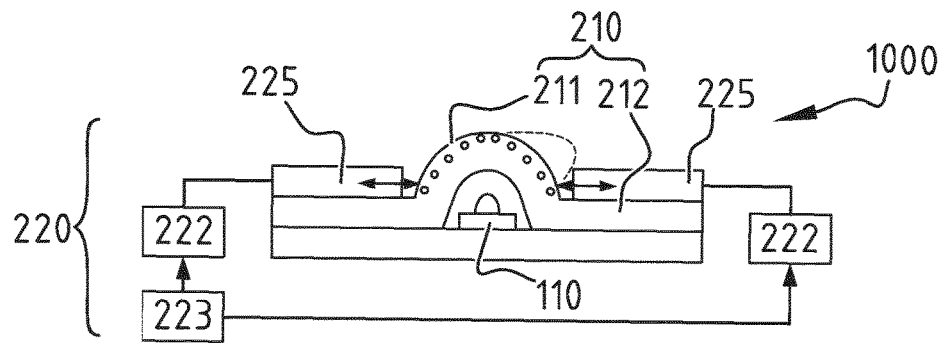
FIG. 3 is a cross section of another exemplary embodiment of a lighting device.
Figure 4A:
FIGS. 4A and 4B are cross sections of possible alternative configurations for the frame elements of the exemplary embodiment of FIG. 3.
Figure 4B:

FIG. 3 shows an alternative embodiment of the lighting device 1000 according to the invention, where the retainer element in the form of two frame elements 225 also forms the moveable or deformable part. Changing the shape of the lens portion 211 can be carried out here either by deformation of the frame elements 225 itself, for example in the case of an embodiment using bimetal strips, as illustrated in FIG. 4B, or alternatively by displacing the frame elements 225 in a plane parallel to the surface of the support 100, as illustrated in FIG. 3 and FIG. 4A. As illustrated in FIG. 4A, the edges 226 of the frame elements 225 may have a shape to guide the deformation of the lens portion 211. In the embodiment of FIG. 3 (and FIG. 4A), the retaining and adjustment means 220 comprises two frame elements 225 arranged adjacent the lens portion 211 and configured for securing the edge portion 212 against the support 100, actuating means 222 configured for displacing the frame elements 225 parallel to the support towards or away from the lens portion 211, in order to change the shape of the lens portion 211, and an optional control means 223 for controlling the actuating means 222.

Figure 5A:
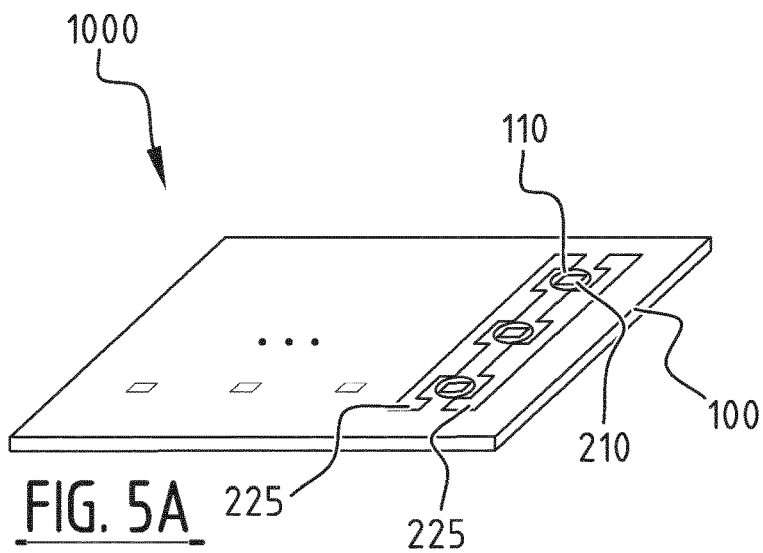
FIG. 5A is a perspective view of a further developed exemplary embodiment of a lighting device.
Figure 5B:
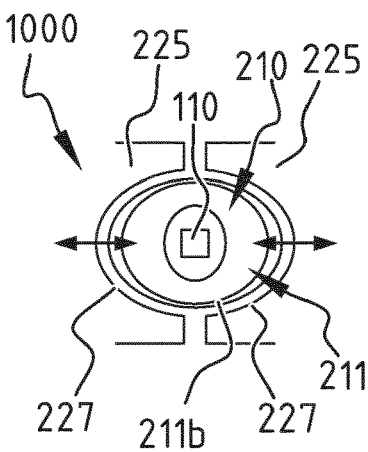
FIG. 5B is a top view of a detail of the exemplary embodiment of FIG. 5A.

FIGS. 5A and 5B illustrate how the frame elements 225 may be shaped. As illustrated in FIG. 5A, in an embodiment with a plurality of light sources and associated lens elements 210, there may be provided two frame elements 225 for a plurality of lens elements 210 arranged in the same row or column, so that the shape of all lens elements 210 of the same row or column may be changed in the same manner simultaneously. Preferably, the frame element 225 has a curved inner edge 227 following the curvature of a portion of the lens portion 211, such that it can surround and press against the circumferential portion 211b of the lens portion 211. The two frame elements 225 may be displaceable, one independently of the other, in a plane parallel to the surface of the support 110.

In other non-illustrated embodiments with a plurality of lens elements 210, each lens portion 211 may be provided with its own pair of frame elements 225. Also, instead of providing two frame elements 225 per lens portion 211, there may be provided a single movable frame element 225 per lens portion 211, or more than two frame elements 225 per lens portion 211.

Figure 6:
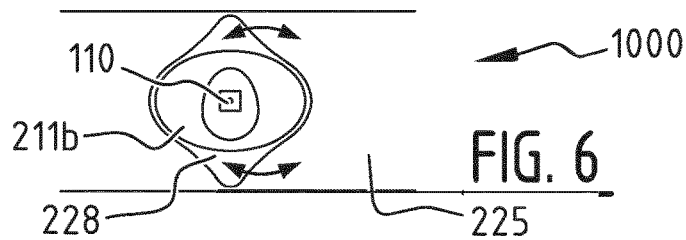
FIG. 6 is a top view of another exemplary embodiment of a lighting device.

FIG. 6 shows another embodiment of a lighting device 1000 according to FIG. 3. Here, the retaining and adjustment means 220 comprises again a movable frame element 225 arranged against the edge portion 212 of the lens element 210. The movable frame element 225 functions both as a retaining and adjustment means. In this embodiment, the frame element 225 has a recess 228 through which the lens portion 211 protrudes outwardly. The recess 228 has a shape which is such that the shape of the lens portion 211 can be changed by rotating the frame element 225 within a plane parallel to the surface of the support 100. In such an embodiment, the lens portion 211 is preferably a free-form lens portion which is non-rotation symmetrical around an axis perpendicular on the support 100.

Figure 7:
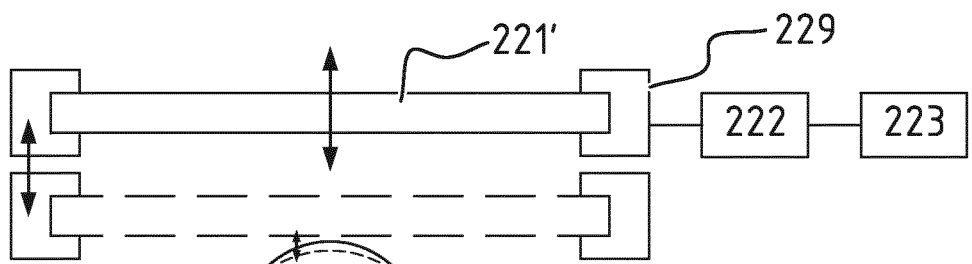
FIG. 7 is cross section of an exemplary embodiment of a lighting device with a moveable transparent plate.

FIG. 7 shows a further alternative embodiment of the lighting device 1000. The retaining and adjustment means 220 comprises a protective cover 221', e.g. a protective glass 221', an actuating means 222 for moving the protective cover 221' and an optional control means 223 for controlling the actuating means 222. The protective cover 221 may be arranged in a securing system 229 and the actuating means may be arranged to move the securing system 229. The protective cover 221' is movable in a direction perpendicular to the surface of the support 100 and can be placed in contact with the lens portion 211, resulting in a change of shape of the flexible lens portion 211. In such an embodiment, the lens portion 211 is preferably a free-form lens portion which is non-rotation symmetrical around an axis perpendicular on the support 100.

Figure 8:
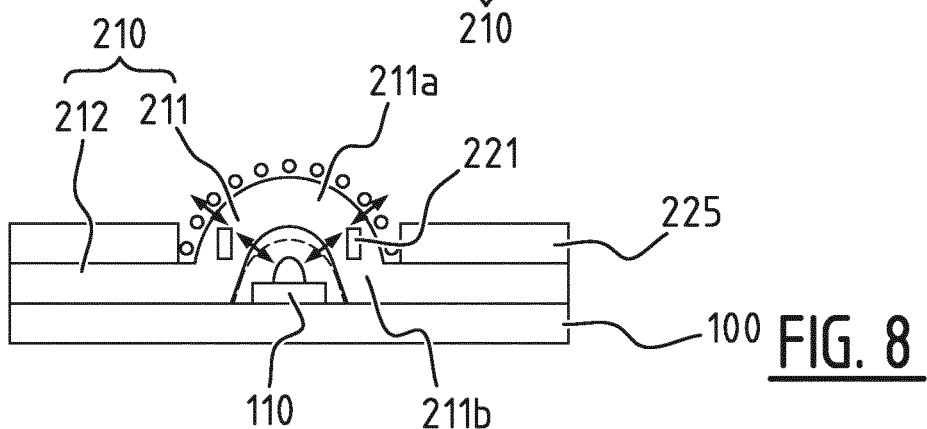
FIG. 8 is cross section of an exemplary embodiment of a lighting device with movable parts integrated in the lens portion.

FIG. 8 shows a further alternative embodiment of the lighting device 1000 according to the invention, where the movable and/or deformable parts 221 are introduced into the lens portion 211, preferably in the circumferential portion 211b thereof. The movable and/or deformable parts 221 may be movable and/or deformable and/or their shape can be changed, in particular under the influence of electrical, magnetic and/or thermal effects caused by actuating means (not shown). A change in shape of the lens portion 211 takes place as a result of a movement or change in shape of the movable and/or deformable parts 221 embedded in the lens portion 211. The movable and/or deformable parts may be solid or fluid. For example, the movable and/or deformable part 221 may be a fluid of which the volume is changed e.g. by heating the fluid using a heat source as the actuating means. In another embodiment, the movable and/or deformable part may be a liquid, and the actuating means may be configured to inject more or less liquid in a cavity of the lens portion 211. In yet other embodiments the movable and/or deformable part 221 may be integral with the actuating means and may comprise e.g. a piezo electric element. In that case, wires for connecting the piezo electric element may pass through the lens portion 211.

Figure 9A:
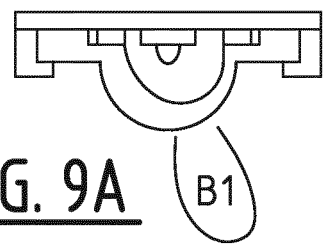
FIGS. 9A-9C illustrate cross sections of another exemplary embodiment of a lighting device in three different modes.
Figure 9B:
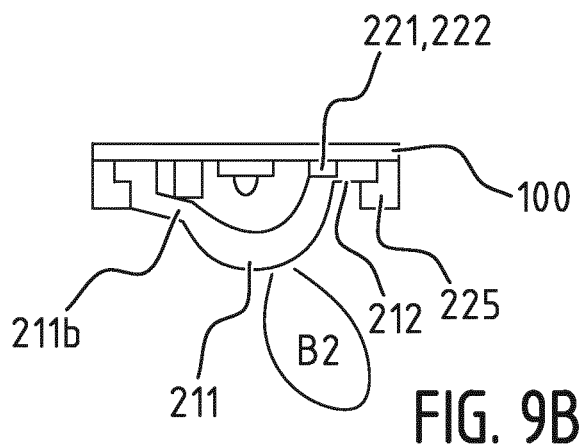
Figure 9C:
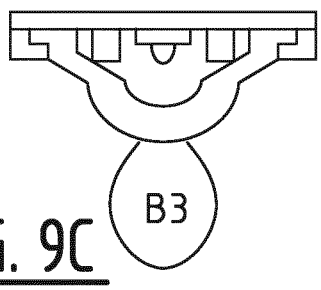

FIGS. 9A-9C illustrate another exemplary embodiment of a lighting device 1000 in three different modes. The lighting device 1000 is similar to the device of FIG. 1A with this difference that piezo electric elements are used, which function both as the deformable parts 221 and the actuating means 222. The piezo electric elements 221, 222 are connected to a control means (not shown) for controlling the piezo electric elements 221, 222 to be in an "on" or an "off" state. In the mode of FIG. 9A both piezo electric elements 221, 222 are off; in the mode of FIG. 9B one piezo electric element 221, 222 is on and the other one is off; in the mode of FIG. 9C both piezo electric elements 221, 222 are on. In that manner, the lens portion 211 can be given at least three different shapes resulting in three different light beams B1, B2, B3. In this embodiment the edge portion 212 of the lens portion 211 is fixed using clamps 225. However, also other retainer means for securing the edge portion 212 are also possible.

Figure 10A:
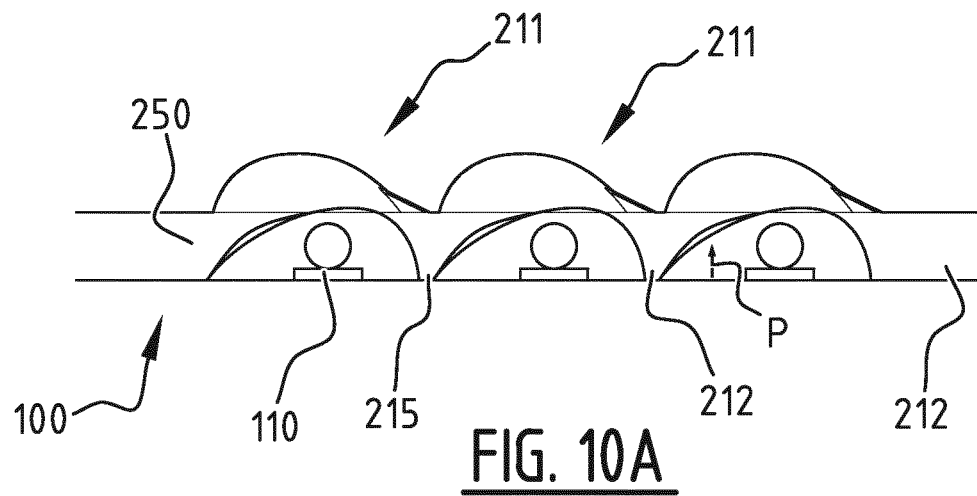
FIGS. 10A-10C illustrate a detailed view of a deformed part of a lens portion, a perspective view of the lighting device including the lens portion, and the light distribution with and without elastic deformation of the lens portion, respectively.
Figure 10B:
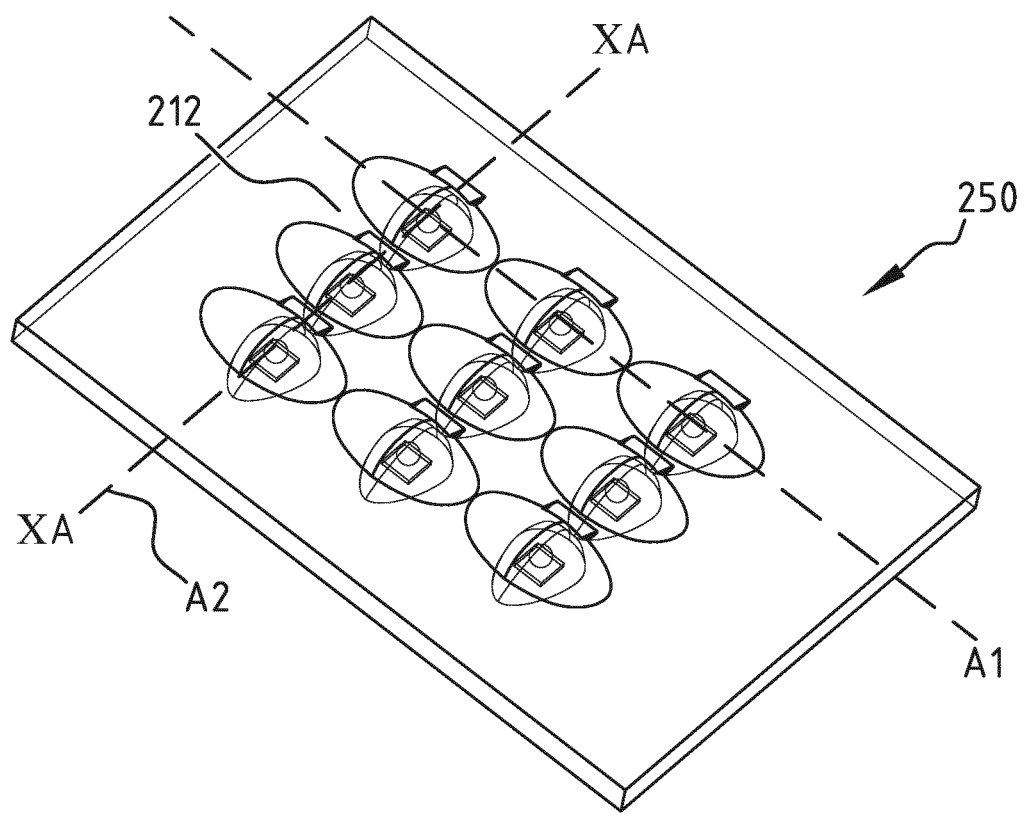
Figure 10C:
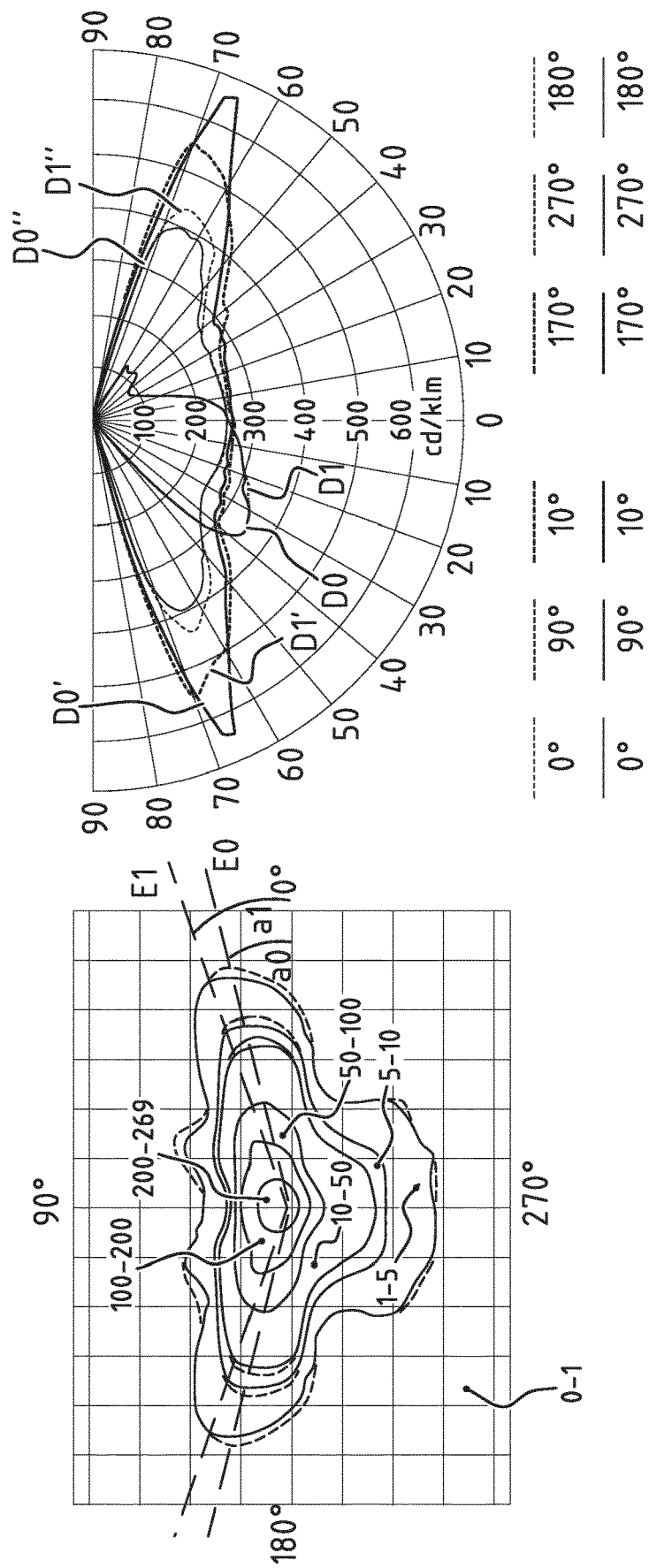

FIGS. 10A-10C illustrate a detailed view of a deformed part of a lens portion, a perspective view of the lighting device including the lens portion, and the light distribution with and without deformation of the lens portion, respectively, for one deformation example. In the example of FIG. 10A-10C, the lens elements 210 are part of a lens plate 250. In other words, the edge portions 212 of the lens elements 210 correspond with the flat portion of the lens plate 250.

FIG. 10A shows a section according to XA-XA in FIG. 10B. In FIG. 10A the internal surface of the lens portion 211 is pushed upward over a distance of e.g. 0.1 mm in a direction perpendicular on the support 100. The resulting change in light distribution is illustrated in FIG. 10C: in the polar diagram on the right, D0 shows the light distribution at 90° (i.e. in a plane through a transversal axis A2 (see FIG. 10B) of the lens portions 211, perpendicular on the support 100 in a normal mode (before the internal surface is pushed upward) and D1 shows the light distribution at 90° in a deformation mode (after the internal surface is pushed upward). D0' shows the light distribution at 10°/170° (i.e. in a plane making an angle of 10°/170° with a longitudinal axis A1 (see FIG. 10B) of the lens portions 211, perpendicular on the support 100) in a normal mode (before the internal surface is pushed upward) and D1' shows the light distribution at 10°/170° in a deformation mode (after the internal surface is pushed upward). D0" shows the light distribution at 0° (i.e. in a plane through axis A1 (see FIG. 10B) of the lens portions 211, perpendicular on the support 100) in a normal mode (before the internal surface is pushed upward) and D1" shows the light distribution at 0° in a deformation mode (after the internal surface is pushed upward).

It can be seen that the shape of the light beam is changed. The light beam is delimited by a non-circular conical envelope with a non-circular directrix D, as schematically illustrated in FIG. 12 which was discussed above. By changing the shape of the lens element, the shape of the right section R of the non-circular conical envelope (i.e. a section through the conical envelope, perpendicular on the axis A of the conical envelope), is changed. The non-circular conical envelope may comprise one or more outer generators G1, G2 located at a local maximum angle with an axis of the non-circular conical envelope, as discussed above in connection with FIG. 12. The diagram on the left of FIG. 10C illustrates the light distribution in a plane parallel to the street plane, which corresponds with a plane of the base B of FIG. 12. The direction E0, E1 corresponds with a maximum in the normal mode and in the deformation mode, respectively, see the diagram on the left of FIG. 10C. As can be seen in the diagram on the left of FIG. 10C, the light beam is symmetrical with respect to the C90/C270 plane which is oriented perpendicular to the street direction, see also FIG. 11. Preferably, the angle a0, a1 between the street axis and the direction E0, E1 corresponding to an outer generator G1 (here two outer generators G1, G2 are present in view of the symmetrical light beam) is changed.

Figure 11:
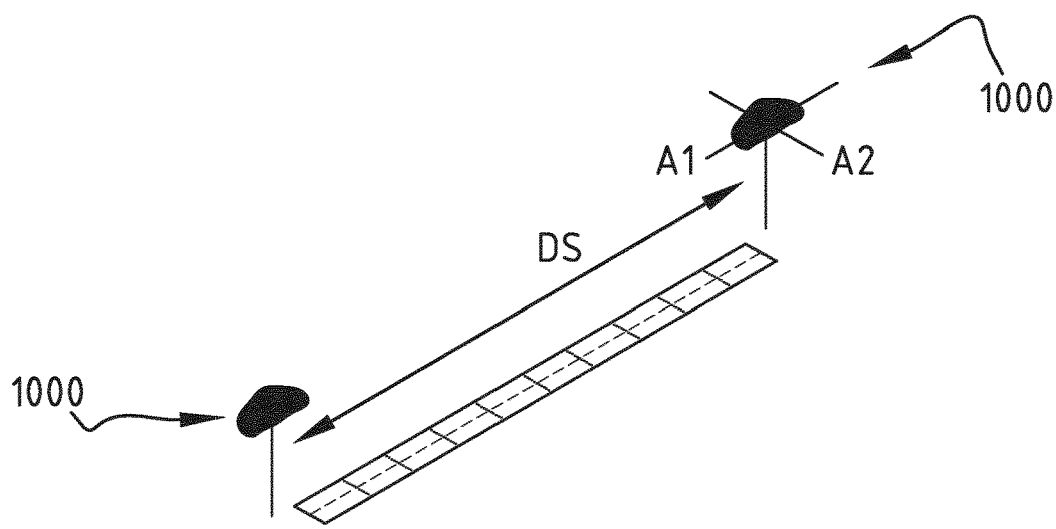
FIG. 11 illustrates a view of a street where the lighting devices of FIGS. 10A-10C are used.
Figure 12:
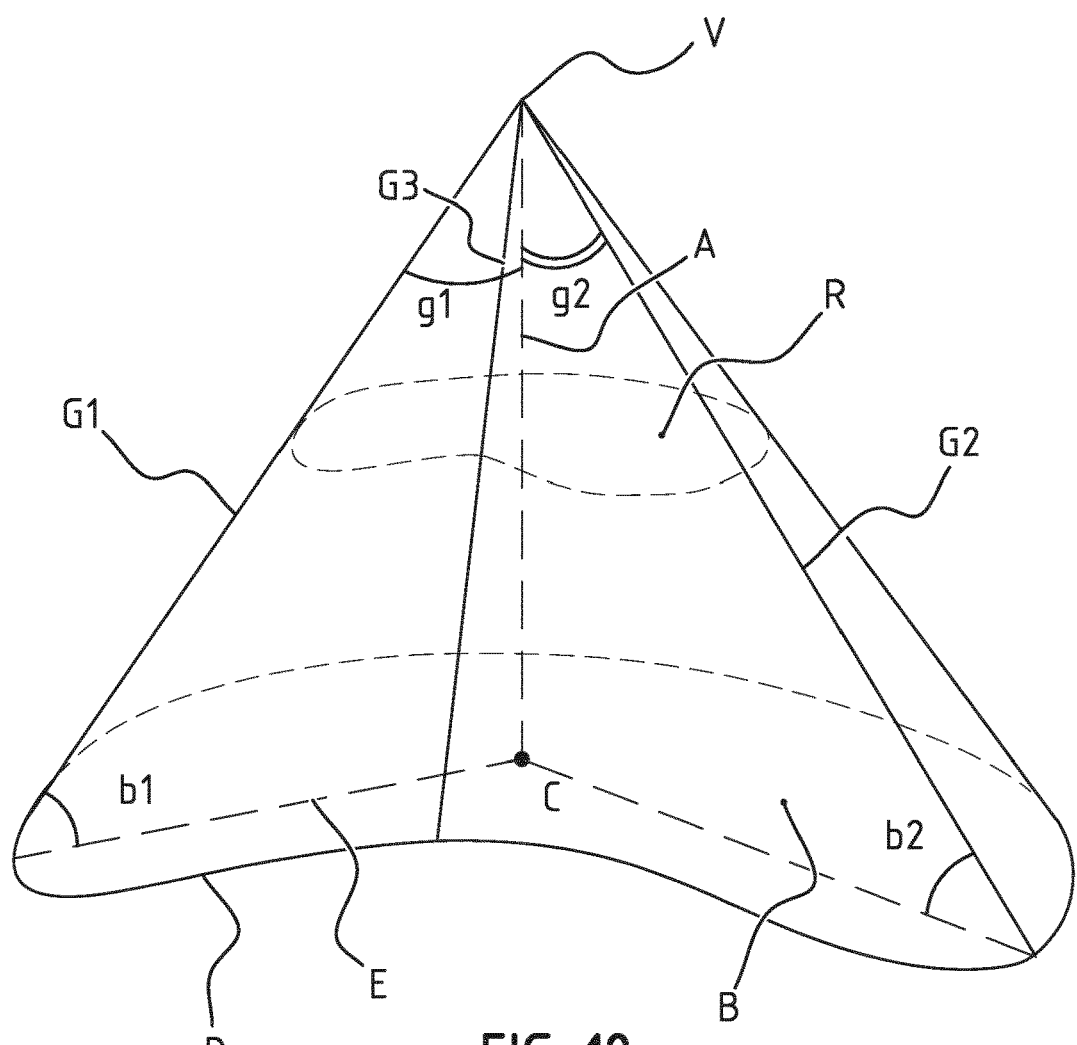
FIG. 12 illustrates schematically a conical envelope delimiting a light beam.

FIG. 11 illustrates a view of a street where the lighting devices 1000 of FIGS. 10A-10C are used. By changing the shape of the lens portion 211 as illustrated in FIG. 10A, the shape of the light beam can be changed and adapted in function of the area of the road that needs to be illuminated, and more in particular the angles a0, a1 as defined above in connection with FIG. 10C can be changed. By adjusting the angle a0, a1, the light beam can be adjusted to the width of the street. For example, for a narrow lane, the light beam can be more narrow (seen in a lateral direction of a lane, corresponding with the direction of axis A2) and longer (seen in a longitudinal direction of a lane, corresponding with the direction of axis A1), and, for a wider lane, the light beam can be wider (seen in the lateral direction of a lane) and shorter (seen in the longitudinal direction of a lane).

The invention claimed is:

1. A lighting device comprising:
  a support with a first light source arranged on the support;
  a lens assembly comprising a flexible solid first lens element extending over the first light source, wherein the first lens element comprises a lens portion and an edge portion surrounding the lens portion, wherein the lens portion comprises a first at least partially concave surface facing the first light source or a second at least partially convex surface located on an opposite side thereof; and
  a retaining and adjustment means configured to change a shape of the lens portion while the edge portion is retained in a fixed position with respect to the support, wherein the first light source and the first lens element are configured to generate a first light beam, and wherein the retaining and adjustment means is configured to adjust the shape of the first light beam.

2. A lighting control system comprising a lighting device according to claim 1 with a control means for controlling the retaining and adjustment means, wherein the control means is configured to receive data and to control the retaining and adjustment means based on the received data.

3. The lighting control system according to claim 2, wherein the control means is configured to control the retaining and adjustment means based on an operation state of the first light source and an additional first light source arranged on the support.

4. The lighting control system according to claim 2, wherein optionally the control means is configured to receive data and to control the moving means based on the received data.

5. The lighting device according to claim 1, wherein the lens portion comprises a central portion and a circumferential portion surrounding the central portion, wherein the circumferential portion is connected to the edge portion, wherein the retaining and adjustment means is configured to be in contact with the circumferential portion and not in contact with the central portion, and wherein the retaining and adjustment means is configured to perform a pushing or pulling action on the circumferential portion.

6. The lighting device according to claim 5, wherein a surface area of the circumferential portion is less than 30% of a surface area of the entire lens portion.

7. The lighting device according to claim 1, wherein the retaining and adjustment means comprises at least one movable or deformable part, wherein the at least one movable or deformable part comprises:
  a fluid;
  an actuating means configured to move or deform the at least one moveable or deformable part; and
  an optional control means configured to control the actuating means.

8. The lighting device according to claim 7, wherein:
  the at least one movable or deformable part is arranged between the support and a circumferential portion of the lens portion; or
  the at least one movable or deformable part is arranged in the circumferential portion of the lens portion.

9. The lighting device according to claim 1,
  wherein a second light source is arranged on the support,
  wherein the lens assembly comprises a flexible solid second lens element extending over the second light source,
  wherein the second lens element comprises a second lens portion and a second edge portion connected to the edge portion of the first lens element,
  wherein the retaining and adjustment means is further configured to change the shape of the second lens portion while the second edge portion is retained in a fixed position with respect to the support,
  wherein the second light source and the second lens element are configured to generate a second light beam,
  wherein the retaining and adjustment means is configured to adjust the shape of the second light beam, and
  wherein the first and second lens element are manufactured in one integral piece.

10. The lighting device according to claim 9, wherein the retaining and adjustment means is configured to change the shape of the first lens portion independently of the shape of the second lens portion and vice versa.

11. The lighting device according to claim 1, wherein the lens element is configured such that the first light beam is delimited by a non-circular conical envelope with a non-circular directrix, and wherein the retaining and adjustment means is configured to adjust the shape of the directrix.

12. The lighting device according to claim 1, wherein the retaining and adjustment means is configured to change a thickness of at least one section of the lens portion or a curvature of at least a section of a surface of the lens portion.

13. The lighting device according to claim 1, wherein the retaining and adjustment means comprises at least one retainer element against which at least one section of the edge portion is supported counter to a change in shape of the lens portion.

14. The lighting device according to claim 1, wherein the retaining and adjustment means comprises at least one frame element arranged adjacent the lens portion and configured to secure the edge portion against the support and actuating means configured for displacing the at least one frame element parallel to the support in order to change the shape of the lens portion.

15. The lighting device according to claim 1, wherein the retaining and adjustment means comprises a transparent or translucent plate arranged in contact with the at least partially convex surface of the lens portion and actuating means for moving the transparent plate relative to the support in order to change the shape of the lens portion.

16. The lighting device according to claim 1,
wherein the lens element is configured such that the first light beam is delimited by a non-circular conical envelope,
wherein the retaining and adjustment means is configured to change a direction of one or more outer generators of the non-circular conical envelope over at least 1°,
wherein the non-circular conical envelope comprises multiple outer generators at local maximum angles with an axis of the non-circular conical envelope, and
wherein the retaining and adjustment means is configured to adjust these local maximum angles.

17. The lighting device according to claim 1,
wherein the first lens element is arranged to be movable relative to the support such that a position of the first lens element geometrically projected on a surface of the support can be changed,
wherein the edge portion of the first lens element is mounted substantially parallel to the support and arranged to be movable relative to the support in a plane substantially parallel to the support, and
wherein the lighting device further comprises a moving means configured to move the first lens element relative to the support.

18. The lighting device according to claim 1, wherein an additional first light source is arranged on the support, opposite the first lens element, and wherein the first light source and the additional first light source are connected such that they can be operated independently of each other.

19. An outdoor luminaire comprising a base and a luminaire head attached to the base, wherein the luminaire head comprises a lighting device according to claim 1.

20. A lighting device comprising:
a support with at least a first light source arranged on the support;
a lens assembly comprising a flexible solid first lens element extending over the first light source, wherein the first lens element comprises a lens portion and an edge portion surrounding the lens portion, wherein the lens portion comprises a first at least partially concave surface facing the first light source or a second at least partially convex surface located on an opposite side thereof; and
a retaining and adjustment means configured to change a shape of the lens portion while the edge portion is retained in a fixed position with respect to the support,
wherein the first light source and the first lens element are configured to generate a first light beam,
wherein the retaining and adjustment means is configured to adjust the shape of the first light beam,
wherein the lens element is configured such that the first light beam is delimited by a non-circular conical envelope with a non-circular directrix, and
wherein the retaining and adjustment means is configured to adjust the shape of the directrix.

* * * * *